(12) United States Patent
Schöllhammer

(10) Patent No.: US 11,060,611 B2
(45) Date of Patent: Jul. 13, 2021

(54) METHOD FOR PRODUCING A FUNCTIONAL ELEMENT, AND FUNCTIONAL ELEMENT

(71) Applicant: ElringKlinger AG, Dettingen (DE)

(72) Inventor: Jochen Schöllhammer, Dettingen (DE)

(73) Assignee: ElringKlinger AG, Dettingen (DE)

( * ) Notice: Subject to any disclaimer, the term of this patent is extended or adjusted under 35 U.S.C. 154(b) by 192 days.

(21) Appl. No.: 15/332,343

(22) Filed: Oct. 24, 2016

(65) Prior Publication Data
US 2017/0037970 A1    Feb. 9, 2017

Related U.S. Application Data

(63) Continuation of application No. PCT/EP2015/056213, filed on Mar. 24, 2015.

(30) Foreign Application Priority Data

Apr. 24, 2014 (DE) ............... 10 2014 105 803.8

(51) Int. Cl.
*F16J 15/06* (2006.01)
*F16J 15/08* (2006.01)
(Continued)

(52) U.S. Cl.
CPC .............. *F16J 15/064* (2013.01); *B32B 3/266* (2013.01); *B32B 5/028* (2013.01); *B32B 27/12* (2013.01);
(Continued)

(58) Field of Classification Search
CPC ...... F16J 15/064; F16J 15/0812; F16J 15/102; F16J 15/104; F16J 15/0818; B32B 3/00;
(Continued)

(56) References Cited

U.S. PATENT DOCUMENTS 3,382,985 A * 5/1968 Muehl ............... F16J 15/104
                                                  210/495
4,817,969 A * 4/1989 McDowell ......... B29C 45/0005
                                                  277/595

(Continued)

FOREIGN PATENT DOCUMENTS

DE    102007019946 A1    10/2008
DE    202010006768 U1    9/2010
(Continued)

*Primary Examiner* — Jennifer A Steele
(74) *Attorney, Agent, or Firm* — Rehinhart Boerner Van Deuren P.C.

(57) ABSTRACT

Method for producing a functional element, in particular for flat seals, wherein a functional layer with at least one screen region is formed in which through openings for the passage of a fluid lie exposed between threads of a woven or braided fabric, wherein the functional layer is provided with at least one sealing region surrounding at least the screen region, in which sealing region sealing material layers are applied thereon to both sides of the woven or braided fabric, said sealing material layers forming a cross-sectionally impermeable layer assembly with the woven or braided fabric at least with an areal application of 5 MPa or more.

14 Claims, 10 Drawing Sheets

(51) Int. Cl.
　　　*B32B 27/12*　　(2006.01)
　　　*B32B 3/26*　　　(2006.01)
　　　*B32B 5/02*　　　(2006.01)
　　　*F16J 15/10*　　 (2006.01)

(52) U.S. Cl.
　　　CPC ....... *F16J 15/0812* (2013.01); *F16J 15/0818* (2013.01); *F16J 15/102* (2013.01); *F16J 15/104* (2013.01); *B32B 2581/00* (2013.01)

(58) Field of Classification Search
　　　CPC ......... B32B 15/14; B32B 3/266; B32B 5/028; B32B 2581/00; B29L 2031/265; B01D 2271/02
　　　See application file for complete search history.

(56) References Cited

U.S. PATENT DOCUMENTS

| | | | | |
|---|---|---|---|---|
| 5,310,197 | A | * | 5/1994 | Bruch ................ F16J 15/123 277/601 |
| 2005/0056966 | A1 | * | 3/2005 | Bartlett ............... B01D 35/30 264/259 |
| 2008/0128993 | A1 | * | 6/2008 | Blakeley .............. F16J 15/064 277/312 |
| 2008/0280040 | A1 | * | 11/2008 | Barrall ................ F16J 15/104 427/256 |
| 2013/0161250 | A1 | | 6/2013 | Szele et al. |
| 2013/0196375 | A1 | * | 8/2013 | Strobbe ............... C12M 23/34 435/69.4 |
| 2014/0090343 | A1 | | 4/2014 | Egloff et al. |

FOREIGN PATENT DOCUMENTS

DE　　　102010030072 A1　　12/2011
WO　　WO 2012/136384 A1　　10/2012

* cited by examiner

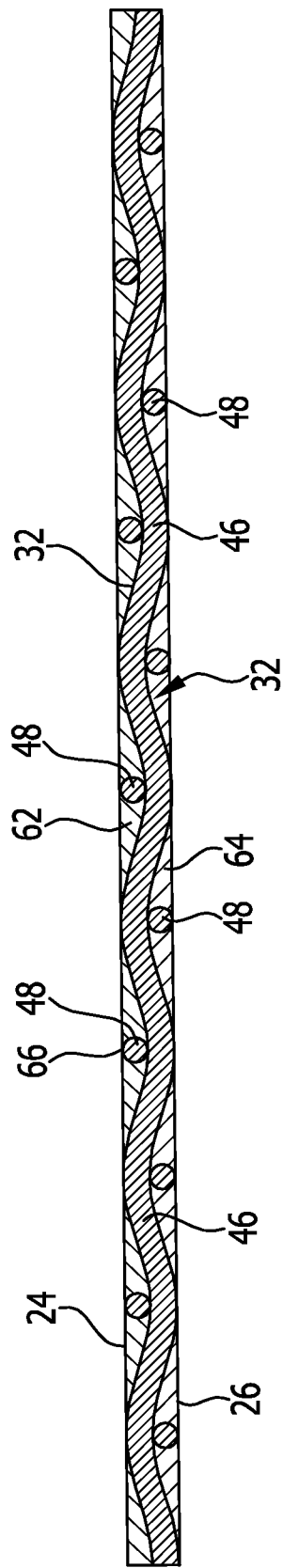

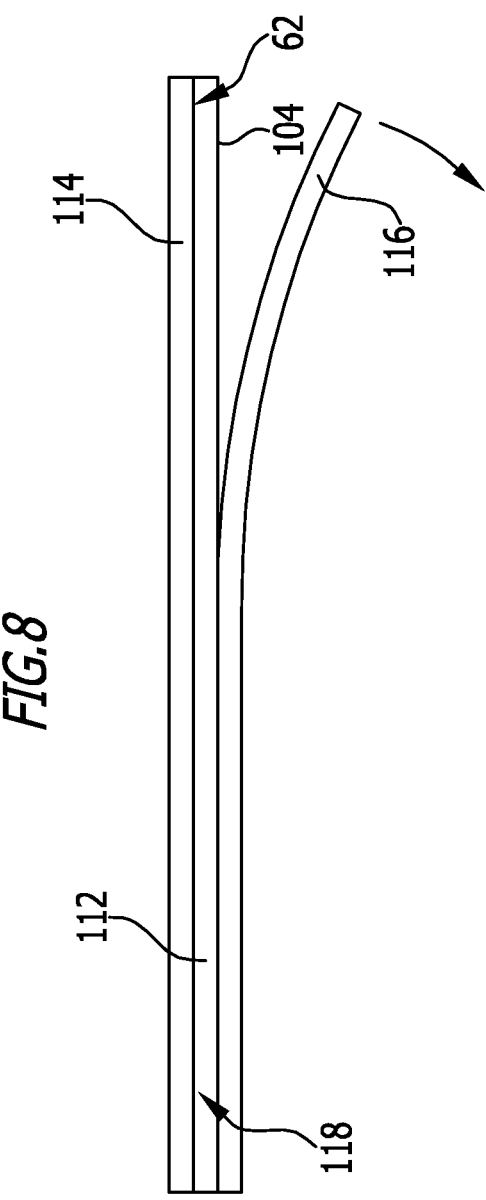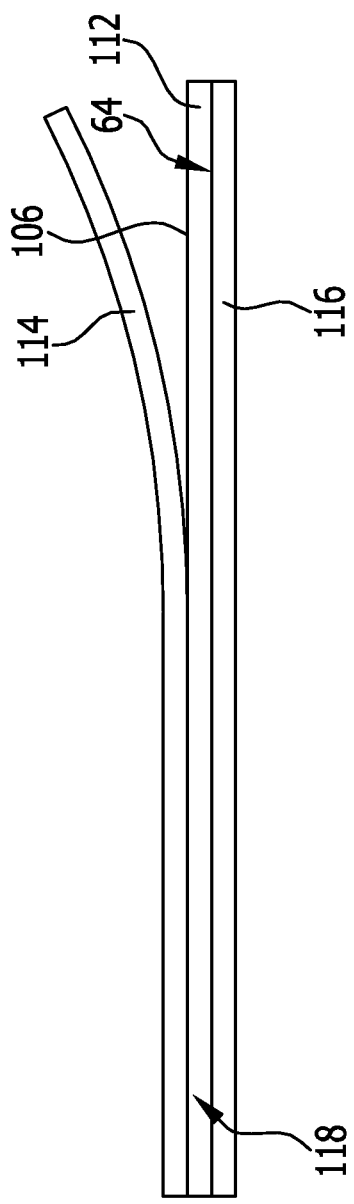

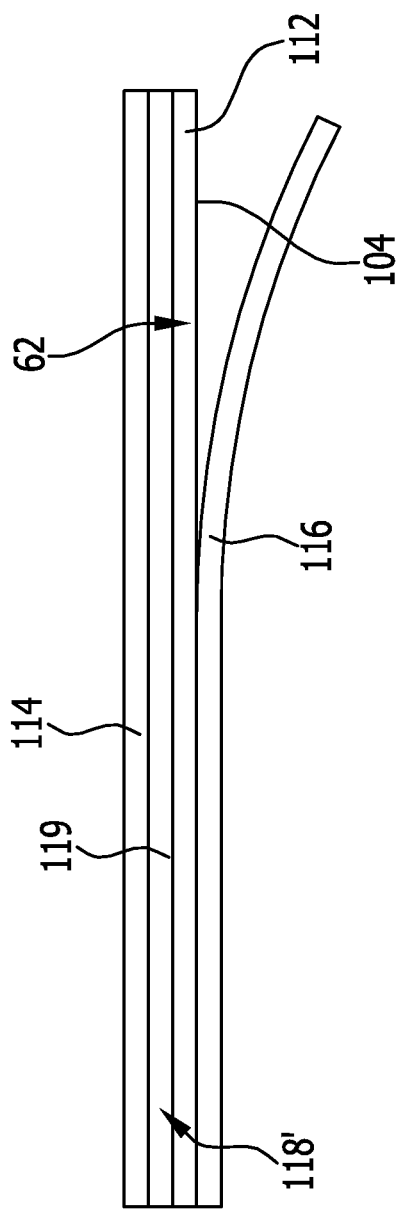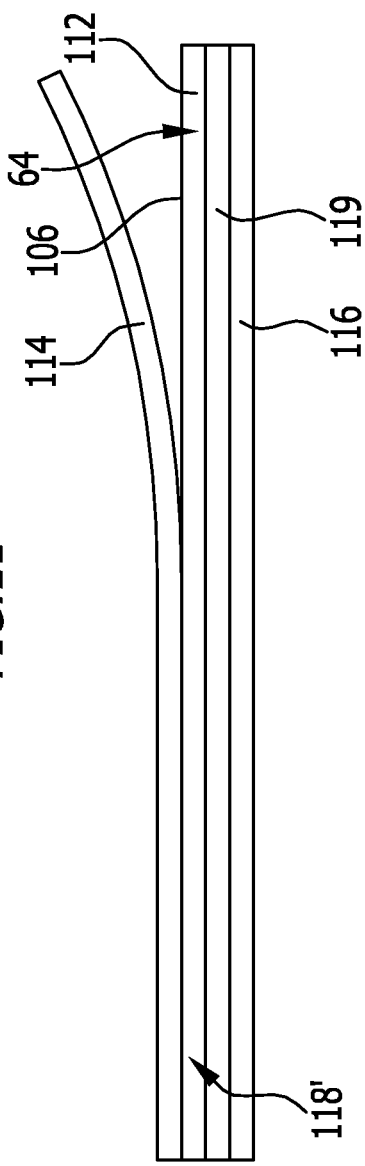

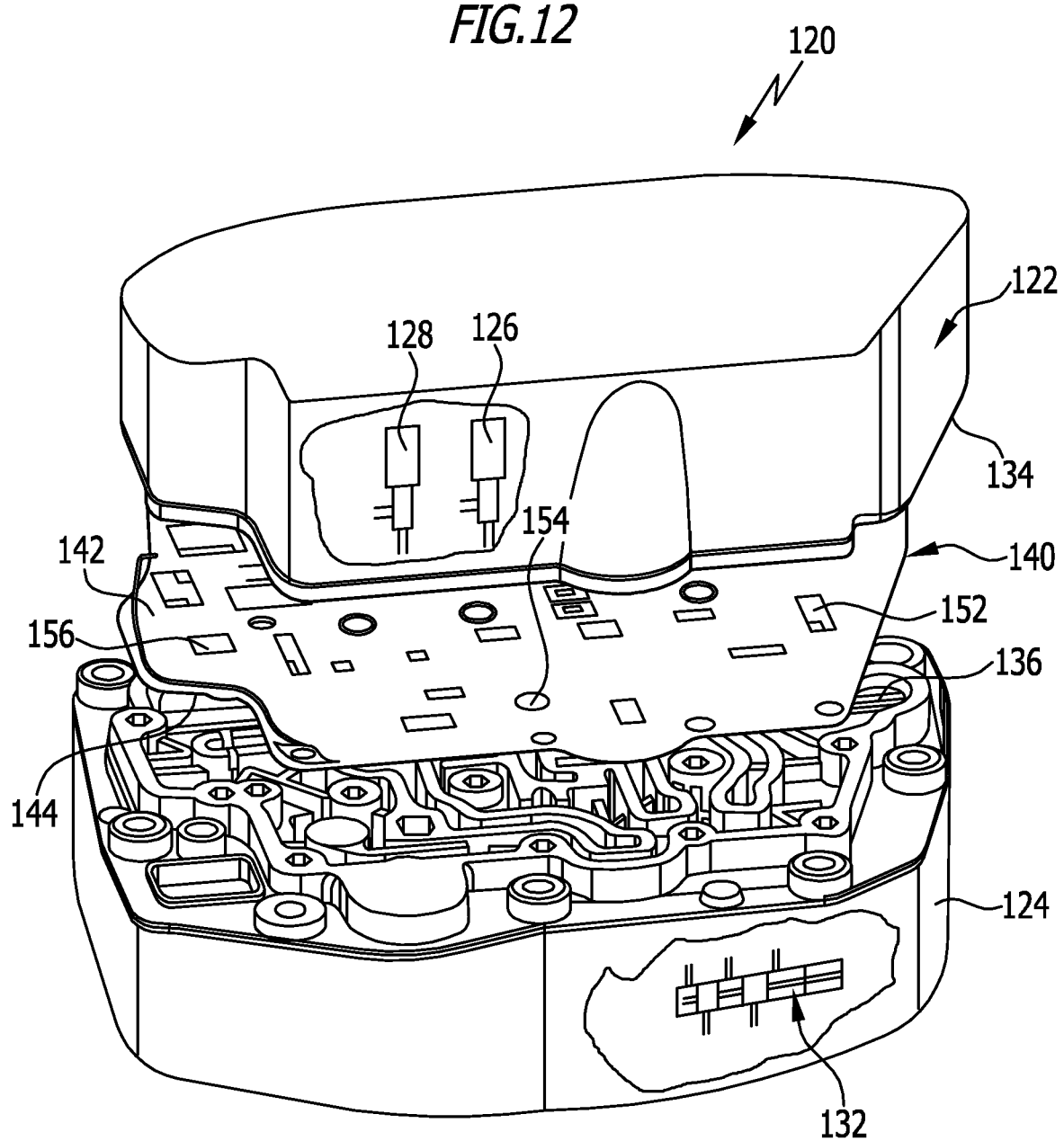

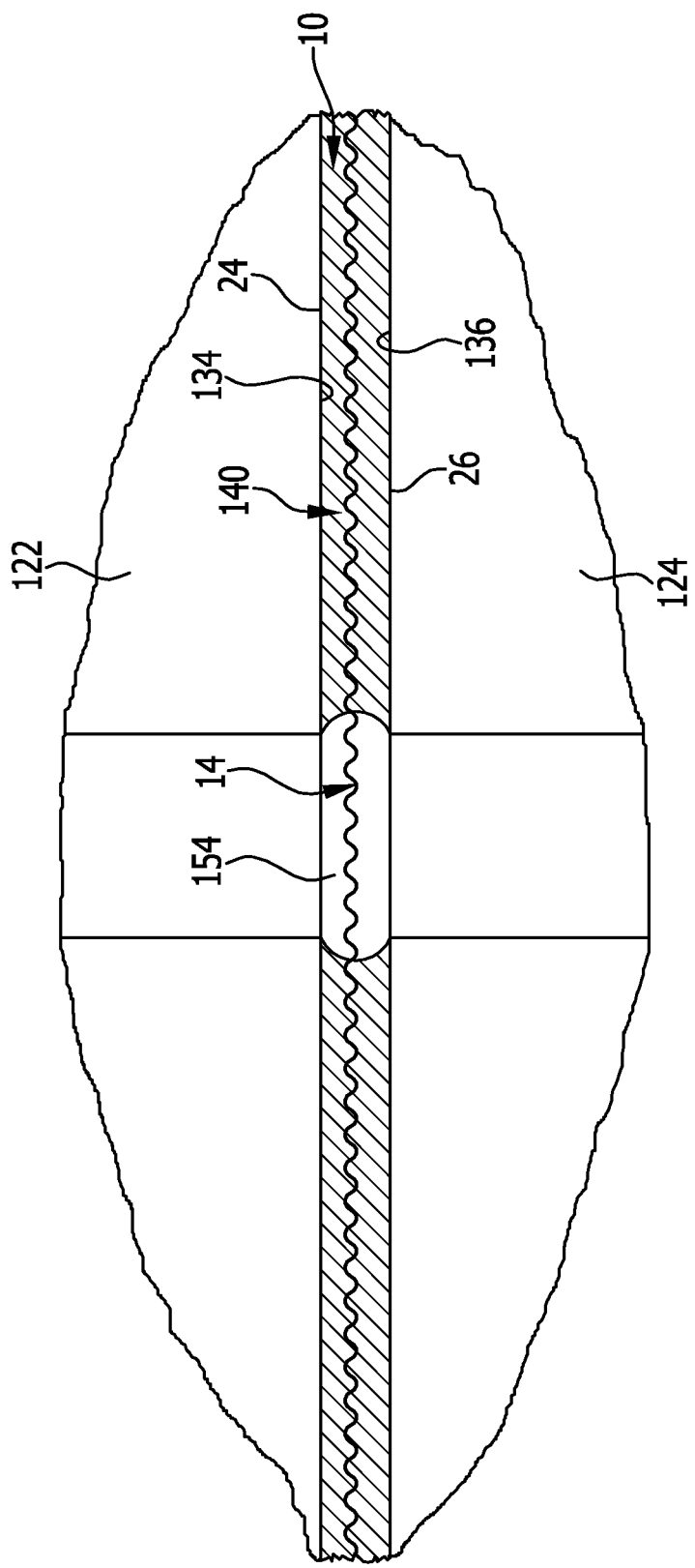

METHOD FOR PRODUCING A FUNCTIONAL ELEMENT, AND FUNCTIONAL ELEMENT

CROSS-REFERENCE TO RELATED PATENT APPLICATIONS

This application is a continuation of International application No. PCT/EP2015/056213 filed on Mar. 24, 2015.

This patent application claims the benefit of International application No. PCT/EP2015/056213 of Mar. 24, 2015 and German application No. 10 2014 105 803.8 of Apr. 24, 2014, the teachings and disclosure of which are hereby incorporated in their entirety by reference thereto.

BACKGROUND OF THE INVENTION

The invention relates to a method for producing a functional element, in particular for flat seals, wherein a functional layer is formed with at least one screen region in which through openings for the passage of a fluid lie exposed between threads of a woven or braided fabric.

Methods of this type are known from the prior art, wherein the problem lies in forming a cross-sectionally impermeable sealing region around the screen region.

SUMMARY OF THE INVENTION

This object is achieved according to the invention with a method of the type described in the introduction in that the functional layer is provided with at least one sealing region which surrounds at least the screen region, in which sealing region sealing material layers are applied thereon to both sides of the woven or braided fabric, said sealing material layers forming a cross-sectionally impermeable layer assembly with the woven or braided fabric at least on an areal application of 5 MPa or more.

The advantage of the solution according to the invention is to be found therein that with it the possibility exists of producing a cross-sectionally impermeable layer assembly by simple means in that sealing material layers are simply applied to both sides of the woven or braided fabric, in order then therewith, at least given the aforementioned areal application of a pressing force of 5 MPa, to result in the cross-sectionally impermeable layer assembly.

A cross-sectionally impermeable layer assembly is herein to be understood as meaning that a gas flow rate through a sealing region surrounding a screen region at a pressure of 1 bar in the screen region is less than 5 ml/min.

With regard to the configuration of the sealing material layers for generating the cross-sectionally impermeable layer assembly, no detailed information has been given.

An advantageous solution thus provides that the sealing material layers are provided with a contact side facing toward the woven or braided fabric, the surface structure of said contact side being adapted to the structure of the woven or braided fabric.

In order to generate the surface structure adapted to the structure of the woven or braided fabric, it is preferably provided that the sealing material layers are made of a mouldable material and are applied to both sides of the woven or braided fabric.

In principle, the adaptation of the surface structure of the sealing material layers to the woven or braided fabric could take place before the application thereof to the woven or braided fabric.

It is particularly favourable if the contact side of the sealing material layers facing toward the woven or braided fabric is formed during a mouldable state of the material of the sealing material layers.

It is herein particularly favourable if the mouldable state of the material of the sealing material layers is created during the production of the sealing material layers.

This means that the sealing material layers are, in particular, applied to the woven or braided fabric in an already mouldable state.

For example, the mouldable state of the material of the sealing material layers can be achieved herein by means of a chemical treatment, for example, by means of a solvent.

Another advantageous solution provides that the mouldable state of the material of the sealing material layers is achieved by a heating thereof.

It is herein particularly favourable if the mouldable state of the material of the sealing material layers is only created after application thereof to the woven or braided fabric.

This is possible, for example, if the mouldable state of the material of the sealing material layers can be achieved by heating.

In particular, it is advantageous if the material of the sealing material layers is partially pressed into the woven or braided fabric in the mouldable state in order thereby to achieve an adaptation of the contact sides to the structure of the woven or braided fabric.

It is herein particularly advantageous that the adaptation of the contact side to the form of the woven or braided fabric takes place directly at the site where the sealing material layers are to cooperate with the woven or braided fabric to form the cross-sectionally impermeable material assembly.

In order to ensure that the blank contours of the sealing material layers are not changed even in the mouldable state of the material of the sealing material layers, it is preferably provided that the sealing material layers remain blank contour-stable in the mouldable state of the material of the sealing material layers.

This means that no deformation of this type is possible of the material of the sealing material layers due to the mouldable state wherein a blank contour changes appreciably, that is, by more than 10%, preferably by more than 5%, of its dimensions.

Such a blank contour-stable form of the sealing material layers is achievable in particular even if the thickness thereof is dimensioned so that on pressing of the material of the sealing material layers into the woven or braided fabric, only one material layer protrudes above the woven or braided fabric with a slight thickness in the direction of the height.

As a result, during pressing of the material of the sealing material layers into the woven or braided fabric, no material flow in the direction parallel to the surface in which the woven or braided fabric extends is generated which could have the result of a significant change to the blank contours of the sealing material layers.

A particularly favourable solution provides that the sealing material layers are plastically deformable in the mouldable state of the material of the sealing material layers, which means that thereby a material flow arises within the sealing material layers which leads to the adaptation of the surface structures of the contact sides of the sealing material layers to the woven or braided fabric.

It is in particular provided therein that the material of the sealing material layers deforms plastically in the mouldable state under an areal application of a pressure of 0.1 MPa or more.

It is thereby defined what maximum ductility or viscosity the material of the sealing material layers can have if an adaptation of the surface structures of the contact sides of the sealing material layers to the structure of the woven or braided fabric is to take place in the sense of the invention.

In order also to prevent a flow of the material of the sealing material layers in the mouldable state, it is preferably provided that the material of the sealing material layers in the mouldable state retains its dimensional stability under an areal application of a pressure of less than 0.05 MPa.

It is provided, in particular, that the material of the sealing material layers has a viscosity in the mouldable state within the value range of 10 to 120 Mooney viscosity units.

One solution can provide that by means of the compressing of the mouldable material of the sealing material layers, the through openings of the woven or braided fabric are closed and also the space regions surrounding the threads of the woven or braided fabric are as far as possible or entirely filled.

This means that in this case, not only are the through openings closed by the filling material, but the space regions adjoining the threads, in particular, next to crossing points are largely or entirely filled.

In this way, gaps or hollow spaces which can impair the cross-sectional impermeability in the sealing region can be prevented as far as possible.

It is particularly favourable for a permanent closing of the through openings if the material of the sealing material layers is compressed so that it penetrates into the through openings and at least partially permeates them.

In order to enable an optimum possible sealing of the functional element in the sealing region, it is preferably provided that by means of the compressing of the mouldable material of the sealing material layers on both sides of the woven or braided fabric, a sealing surface suitable for sealing against a contact surface is formed.

A sealing surface of this type is configured, for example, so that it has a surface roughness which is smaller than a thread thickness, or better, smaller than half of a thread thickness and preferably smaller than a tenth of a thread thickness.

In particular, it is advantageous if the surface roughness is less than 20 µm, or better, less than 10 µm.

Thus, sufficiently precise sealing surfaces are available in order to be able to realise a sealing of the functional element lastingly with simple means.

In particular, it is therein provided that the respective sealing surface is configured for sealing against a contact surface of an assembly of inelastic height.

This means that the surface quality of the sealing surface is so good that the low elasticity of the sealing region is sufficient to achieve a sufficiently good sealing against a contact surface of an assembly of inelastic height.

With regard to the manner and means by which the mouldable material of the sealing material layers is to transition into the later desired non-mouldable state, so far no detailed information has been given.

In the case of a material which is transformable into a mouldable state by heating, in a simple manner, the cooling of the material can again be awaited in order to achieve the non-mouldable state once more.

In the case of a chemical process for producing the mouldable state, for example, a treatment with a solvent, the non-mouldable state can also be achieved again in that the evaporation of the solvent is awaited.

Another type of procedure for achieving the non-mouldable state provides that the sealing material layers are produced from a material which, during an application with a pressure in the range of 10 to 50 MPa, transitions from the mouldable to the non-mouldable state.

A particularly favourable solution provides that the sealing material layers are configured elastically deformable in the non-mouldable state of the material of the sealing material layers.

This elastic behaviour of the sealing material layers in the non-mouldable state enables a cross-sectionally impermeable state to be achieved by easy means, as described below.

It is particularly favourable if the sealing material layers are configured height-elastically deformable in the non-mouldable state of the material of the sealing material layers, so that in particular the possibility exists of using the sealing material layers simultaneously as seal elements.

Since at least in some embodiments the sealing material layers provided according to the invention have a viscosity which hinders complete adaptation to the course of the threads of the woven or braided fabric, an advantageous solution provides that in the non-mouldable state, without areal pressure application, the sealing material layers form hollow space regions with the woven or braided fabric.

With regard to the connection between the woven or braided fabric and the sealing material layers, so far no detailed information has been given.

An advantageous solution thus provides that the sealing material layers and the woven or braided fabric are connected to one another by adhesion of the sealing material layers to the woven or braided fabric, which means, in particular, that a direct adhesive connection is created between the sealing material layers and the woven or braided fabric, in particular the threads thereof.

This is realisable in particular if the sealing material layers are produced from a material wetting the woven or braided fabric so that an adhesive connection is thereby creatable by simple means.

In the simplest case, it is herein provided that the material of the sealing material layers adheres self-adhesively to the woven or braided fabric.

Alternatively, it is provided that the material of the sealing material layers is connected to the woven or braided fabric by means of an adhesion promoter.

The sealing material layers could be formed, for example, from individual surface pieces to be laid onto the woven or braided fabric.

However, an advantageous solution provides that the sealing material layers are configured as regions of appliable blanks which are appliable to both sides of the woven or braided fabric.

The appliable blanks are herein configured, in particular, so that they are provided with at least one cut-out for the at least one screen region and thus entirely surround the at least one screen region.

In particular, it is provided that the at least one cut-out for the at least one screen region is produced before application of the respective appliable blank to the woven or braided fabric.

In the event that the functional layer is provided with a through opening region, it is preferably also provided that the appliable blanks are provided with at least one cut-out for the at least one through opening region of the functional layer.

In the event that the functional layer is provided with a passage region, it is preferably provided that the appliable blanks are provided with at least one cut-out for at least one passage region of the functional layer.

It is advantageous, in particular, for the production of the functional layer if the appliable blanks are provided with the cut-outs for the through opening region or the passage region before the application to the woven or braided fabric.

It is possible to work particularly efficiently with the appliable blanks provided according to the invention if the appliable blanks are provided with the cut-outs in the non-mouldable state of the material of the sealing material layers since, in this case a simple cutting to size, for example by stamping processes, can take place.

A particularly advantageous manner of producing the appliable blanks provides that the respective appliable blank is cut to size such that the sealing material layers are connected to one another coextensively for all the sealing regions of the functional layer.

In the context of the solution according to the invention, it is further particularly advantageous if the sealing material layers are formed as sub-regions of appliable blanks which are to be applied as a whole to both sides of a blank of the woven or braided fabric, that is, that the functional layer is ultimately formed by means of the blank of the woven fabric and the two appliable blanks which are appliable to this blank of the woven fabric, which have all of the sealing material layers for this functional layer.

Preferably, the appliable blanks are herein provided with an external blank contour which extends following an external blank contour of the blank of the woven or braided fabric.

It is favourable in particular if the blank contour of the appliable blanks is formed according to the external blank contour of the blank of the woven or braided fabric.

In particular, it is advantageous for the sealing properties in the installed state of the functional element if the appliable blanks are deformable in the installed state of the functional element in a non-plastic state, but elastically.

It is preferably provided herein that in the elastically deformable state, the appliable blanks have a Shore hardness in the range from 40 Shore A to 90 Shore A.

The object defined in the introduction is further achieved by means of a functional element, in particular for flat seals, wherein a functional layer comprises at least one screen region in which through openings for the passage of a fluid lie exposed between threads of a woven or braided fabric, wherein, according to the invention, the functional layer comprises a sealing region which surrounds at least the screen region, in which sealing region sealing material layers lie on both sides of the woven or braided fabric, said sealing material layers forming a cross-sectionally impermeable layer assembly with the woven or braided fabric at least with an areal application of 5 MPa or more.

The advantage of this solution is also to be found therein that therewith the possibility exists of producing a cross-sectionally impermeable layer assembly by easy means.

It is particularly advantageous if the sealing material layers are provided with a contact side facing toward the woven or braided fabric, the surface structure of said contact side being adapted to the structure of the woven or braided fabric.

Preferably, an adaptation of the contact side to the woven or braided fabric can be produced in that the sealing material layers are produced from a mouldable material and lie on both sides on the woven or braided fabric.

For the requirement of the cross-sectionally impermeable layer assembly, it is particularly advantageous if the material of the sealing material layers is at least partially pressed into the woven or braided fabric.

A mouldable material of this type for the sealing material layers is, for example, a material corresponding to a thermoplastic material or a material which is chemically initially in a mouldable state and then transitions from the mouldable state into a non-mouldable state.

A particularly favourable solution provides that the sealing material layers are made of a material which, in the process of an application of a pressure of 1 MPa or more, transitions from the mouldable to the non-mouldable state.

At least in an installed state, it is herein provided that the material of the sealing material layers is made of a material which is no longer in a mouldable state.

It is advantageous herein, however, if the sealing material layers are elastically deformable in the non-mouldable state of the material of the sealing material layers.

By means of this elastic deformability, the possibility exists, if necessary, of reducing still existing hollow spaces in the region round the threads of the woven or braided fabric so far that a cross-sectionally impermeable layer assembly comes about.

It is particularly favourable herein if the sealing material layers are height-elastically deformable in the non-mouldable state of the material of the sealing material layers.

In this case, the possibility exists also of using the sealing material layers simultaneously as seal elements in order to achieve, for example, a sealing relative to the rigid contact surfaces of units between which the functional element according to the invention is to act sealingly.

For example, the elastic deformability is advantageous particularly when in the non-mouldable state, without areal pressure application, the sealing material layers form hollow space regions with the woven or braided fabric.

This is particularly the case if, in the mouldable state, the ductility or viscosity of the material of the sealing material layers is so great that complete application of this material on the threads of the woven or braided fabric does not take place, but for example, hollow space regions or gaps can remain in crossing regions or along the threads.

With regard to the connection between the sealing material layers and the woven or braided fabric, in particular the threads of the woven or braided fabric, so far no detailed information has been given.

An advantageous solution thus provides that the sealing material layers and the woven or braided fabric are connected to one another by adhesion, which means that the sealing material layers adhere to the woven or braided fabric and thus enter into an intimate connection with the woven or braided fabric.

This is realisable, for example, in that the sealing material layers are produced from a material wetting the woven or braided fabric.

One solution herein provides that the material of the sealing material layers adheres self-adhesively to the woven or braided fabric.

Alternatively thereto, it is also conceivable, however, that the material of the sealing material layers is connected to the woven or braided fabric by means of an adhesion promoter, for example an adhesive film.

In any event, however, a connection is created between the woven or braided fabric and the respective sealing material layers.

With regard to the configuration of the sealing material layers, no detailed indications have so far been given in the context of the description above of the individual embodiments.

It is conceivable, for example, to put together the sealing material layers from a plurality of individual flat pieces.

However, a suitable solution provides that the sealing material layers are regions of appliable blanks lying on both sides of the woven or braided fabric, so that the sealing material layers are, in particular, a coextensive structure.

Preferably, the appliable blanks are herein configured so that they are provided with at least one cut-out for the at least one screen region, so that the respective sealing material layer for each screen region, in particular, entirely surrounds it.

Furthermore, it is preferably also provided that the appliable blanks are provided with at least one cut-out for at least one through opening region.

In a further embodiment, it is suitably provided that the appliable blanks are provided with at least one cut-out for at least one passage region of the functional layer.

A further advantageous solution provides that the appliable blanks are cut to size such that the sealing material layers for all the sealing regions of the functional layer are connected to one another coextensively, so that by means of the application of an appliable blank, all the sealing material layers are applied to the respective side of the woven or braided fabric and are thus positioned in exact orientation to one another on the woven or braided fabric.

A further advantageous solution provides that the sealing material layers are formed as sub-regions of appliable blanks which are to be applied as a whole from both sides to a blank of the woven or braided fabric, so that in this case all the sealing material layers can be applied by means of the application of the appliable blanks to a blank of the woven or braided fabric.

It is particularly favourable herein if the appliable blanks have an external blank contour which extends following an external blank contour of the woven or braided fabric.

In particular, it is advantageous if the external blank contour of the appliable blanks is formed according to the external blank contour of the woven or braided fabric.

For example, in an advantageous solution according to the invention, it is provided that in the installed state of the functional element, the appliable blanks are deformable in a non-plastically mouldable state, but elastically in order thereby, for example, to obtain in a simple manner a sealing of elements appliable to the functional element.

A particularly advantageous solution provides that in the elastically deformable state, the appliable blanks have a Shore hardness in the range from 40 Shore A to 90 Shore A.

With regard to the configuration of the threads themselves, so far no detailed information has been given.

An advantageous solution provides that the threads have a thickness of not more than 300 µm, but it is better if the threads have a thickness of not more than 200 µm and still better, a thickness of not more than 100 µm, and particularly preferably, a thickness of not more than 50 µm, in order to be able to use a very fine woven or braided fabric.

The threads can be, for example, metal threads and, in particular, it is conceivable to use stainless steel threads as the threads.

Another advantageous solution provides, however, that the woven or braided fabric is formed of plastics threads.

Such plastics threads can be configured from greatly differing materials.

A particularly suitable solution provides that the woven or braided fabric has threads of thermoplastic material, wherein the thermoplastic material of the threads is thermally softened and compressed as filling material to close the through opening.

In this case, therefore, the material can be partially or entirely employed to close the through openings by means of the softened portion of the material of the threads.

In another solution wherein, in particular, the woven or braided fabric forms a stable base for the sealing region, it is preferably provided that the functional layer is formed by a woven or braided fabric of threads the melting point of which lies so far above the melting point of the thermoplastic material of the sealing material layers applied to it that on softening of the applied thermoplastic material, no softening of the threads takes place.

In this case, therefore, the threads remain undeformed even on softening of the material of the sealing material layers and retain their mechanical properties in order thus to have a stable base for the sealing region and the transition between the sealing region and the screen region, so that no thread breakages or other breakage occurrences take place at the transition from the screen region to the sealing region.

With regard to the further configuration of the functional element, so far no detailed information has been given.

In principle, a functional element of this type with the previously defined features can be used as a flat seal.

Alternatively thereto, it is particularly advantageous for the use of a functional element according to the invention as a flat seal if a seal element is provided on at least one of the sealing surfaces.

A seal element of this type serves as an element, in particular, of elastic height to produce a seal to a contact surface of an assembly, wherein a seal element of this type of elastic height serves, in particular, to bridge and therefore to close a gap between the sealing surface and the contact surface of the assembly, particularly when said gap varies over the extent of the gap.

For this reason it is provided, for example, that at least one of the sealing regions is provided with a seal element of elastomer material.

An elastomer material of this type provides the possibility, in the usual manner, of bridging the gap elastically between the sealing surface and a contact surface of the assembly.

An elastomer layer of this type can be applied, for example, subsequently after formation of the sealing surfaces.

A particularly advantageous solution with regard to the production provides that the seal element of elastomer material is applied, together with the sealing material layer, to the woven or braided fabric, wherein particularly in this case, it is provided that on softening of the sealing material layer, the elastomer layer undergoes no shape change, so that the elastomer layer is present unchanged when the filling material is pressed into the woven or braided fabric.

Preferably, the elastomer layer is made of a thermosetting plastics material and is therefore not thermally softenable.

Another advantageous solution provides that at least one layer of a metallic flat material is provided on the at least one sealing surface as a seal element.

It is preferably provided herein that the at least one layer of metallic flat material is provided with at least one seal element, wherein a seal element of this type can be configured, for example, as an elastomer support or a bead.

Further features and advantages of the invention are the subject matter of the following description and of the illustration in the drawings of some exemplary embodiments.

BRIEF DESCRIPTION OF THE DRAWINGS

FIG. 6 shows a section similar to FIG. 4 with pressure application on the sealing material layers for producing the cross-sectionally impermeable layer assembly in the region of the crossing sites of the threads;

FIG. 7 shows a section similar to FIG. 5 but also with pressure application on the sealing material layers for producing the cross-sectionally impermeable layer assembly in the region of the threads;

FIG. 8 shows a cross-section through a handling assembly for a sealing material layer before application thereof to the woven or braided fabric;

FIG. 9 shows a section similar to FIG. 8 through a further handling assembly for a sealing material layer before application thereof;

FIG. 10 shows a section through a further exemplary embodiment of a handling assembly for a sealing material layer similar to FIG. 8;

FIG. 11 shows a section through a further exemplary embodiment of a handling assembly according to FIG. 10;

FIG. 12 shows a view of a control unit with an intermediate plate comprising a functional element according to the invention;

FIG. 13 shows a section through a first embodiment of the intermediate plate according to FIG. 12, configured from a functional element according to the first exemplary embodiment

DETAILED DESCRIPTION OF THE INVENTION

Figure 1:
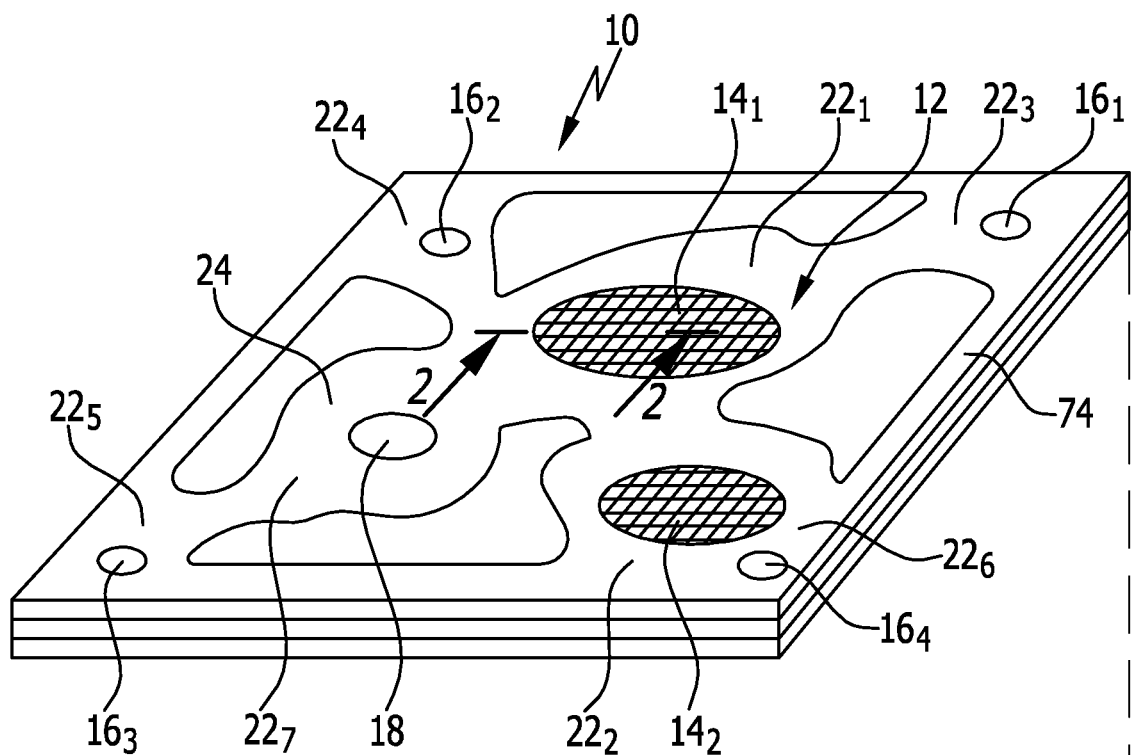
FIG. 1 shows a perspective view of a first exemplary embodiment of a functional element according to the invention.

A functional element shown in FIG. 1 and identified overall as 10, in particular for flat seals, comprises a functional layer identified overall as 12 which has, for example, screen regions $14_1$, $14_2$ by means of which a filtration of a fluid passing through the functional layer 12 is to take place.

For example, the functional layer 12 can also have, in addition to the screen regions 14, through opening regions $16_1$, $16_2$, $16_3$ and $16_4$ through which, for example, a mechanical connection of two units between which the functional element 10 according to the invention is arranged can take place and between which, for example, a fluid exchange is to take place through the screen regions $14_1$ and $14_2$.

Furthermore, a functional element 10 of this type also comprises one or more passages 18 through which a fluid can pass wherein in this case, the fluid does not pass through a filter or screen, but can flow unhindered through a free cross-section of the respective passage 18.

Figure 2:
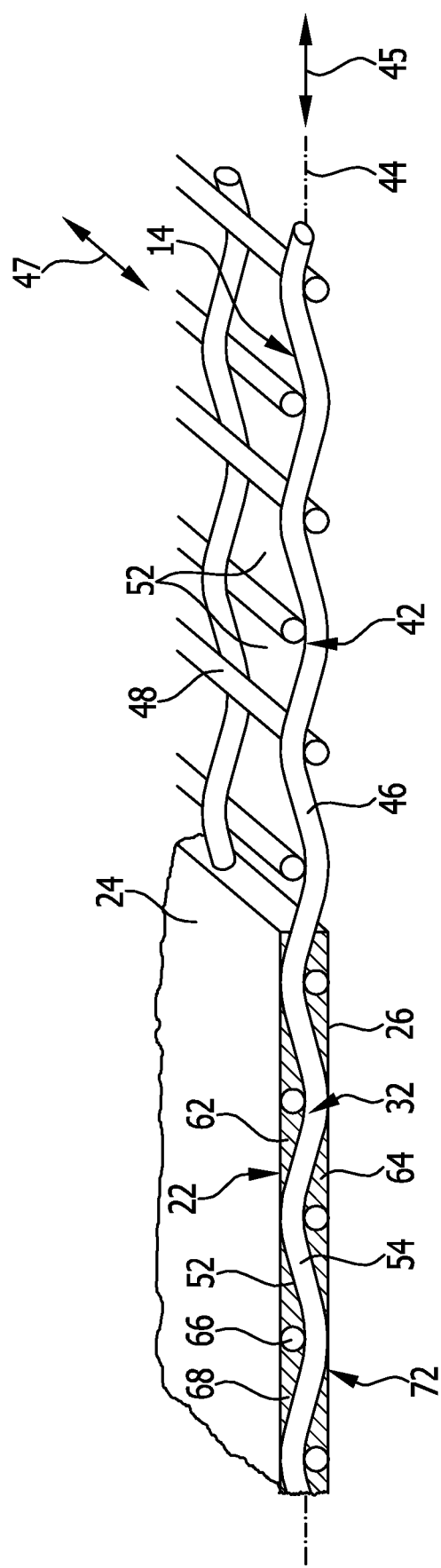
FIG. 2 shows a section along the line 2-2 in FIG. 1.

For sealing round the screen regions 14, the through opening regions 16, and round the at least one or more passage regions 18, sealing regions $22_1$ to $22_7$ are provided surrounding them which bring about a sealing round the screen regions 14, the passage regions 18 and the through opening regions 16 between sealing surfaces 24 and 26 of the functional layer 12 lying opposite one another, as shown in FIG. 2, wherein in a sealing region 22 of this type a layer assembly 32 is present which comprises a woven or braided fabric 42 which extends in a plane 44 and comprises threads 46 extending in a first direction 45 parallel to the plane 44, and threads 48 transverse to these threads 46, extending in a second direction 47 parallel to the plane 44, between which through openings 52 are present through which the fluid can flow in the respective screen region 14, wherein the screen or filter effect is determined by the size of the through openings 52.

Outside the screen regions 14, the woven or braided fabric 42 forms a basic structure 54 of the functional layer 12 on which at least in the sealing regions 22, sealing material layers 62 and 64 lie which, together with the basic structure 54, form the cross-sectionally impermeable layer assembly 32 in the sealing regions 22, in particular at least if a pressure of 5 MPa or more is applied areally to the sealing surfaces 24, 26.

In this case, the sealing material layers 62 and 64 lie on the basic structure 54 formed by the woven or braided fabric 42 such that at the crossing sites 66 of the threads 44 and 46 situated in the sealing regions 22 and at the space regions 68 situated laterally adjoining the through openings 52, the sealing material layers 62 and 64 lie largely on the threads 44 and 46 of the woven or braided fabric 42, wherein the sealing material layers 62 and 64 in particular fill out the space between the sealing surfaces 24 and 26, substantially free from hollow spaces.

The expression cross-sectionally impermeable is herein to be understood as meaning that a gas flow rate through a sealing region surrounding a screen region 14 or a through opening region 16 or a passage region 18 at a pressure of 1 bar is less than 5 ml/min.

In particular, the sealing surfaces 24 and 26 are arranged, transversely to their areal extent, at a spacing from one another which preferably corresponds to at least the sum of the thickness of a thread 46 and the thickness of a thread 48, since they lie over one another at the crossing sites 66 and thus determine the minimum spacing of the sealing surfaces 24, 26 if no deformation of the threads 46, 48 is to take place.

Thus, at least in the respective sealing region 22, a dimensionally stable structure 72 similar to a fibre composite material results.

This dimensionally stable structure 72 stabilises not only the screen regions 14 or through opening regions 16 or passage regions 18 surrounded by it, but also the woven or braided fabric 42 overall, so that, for example, such a dimensionally stable structure 72 is provided in all regions of the functional element 10 outside the screen regions 14 and the through opening regions 16 or the passage regions 18.

In particular, it is also advantageous to provide such a dimensionally stable structure 72 close to the external edge regions of the functional layer 12 in order thereby to provide the functional layer 12 with the dimensionally stable edge region 74 which surrounds it as a whole and thus supports the overall dimensional stability of the functional layer 12.

With regard to the formation of the sealing surfaces 24, 26, so far no detailed information has been given.

For example, the sealing surfaces 24 and 26 can be provided with a low surface roughness suitable for a direct sealing which amounts to less than 10 μm.

Apart from that, it is also conceivable additionally to provide the sealing surfaces 24, 26 with additional seal elements, for example, seal layers made of beaded sheets.

However, in order to configure the sealing surfaces 24, 26 such that they are suitable for direct sealing, the sealing material layers 62, 64 are to be configured such that they have sufficient dimensional stability, that is, that the sealing material layers 62, 64, if the functional element 10 is to lie sealingly against counter-surfaces, are capable of lastingly absorbing sufficiently large surface pressures, for example, in the range of more than 1 MPa up to 50 MPa without avoiding these surface pressures by creeping or flowing.

Figure 3:
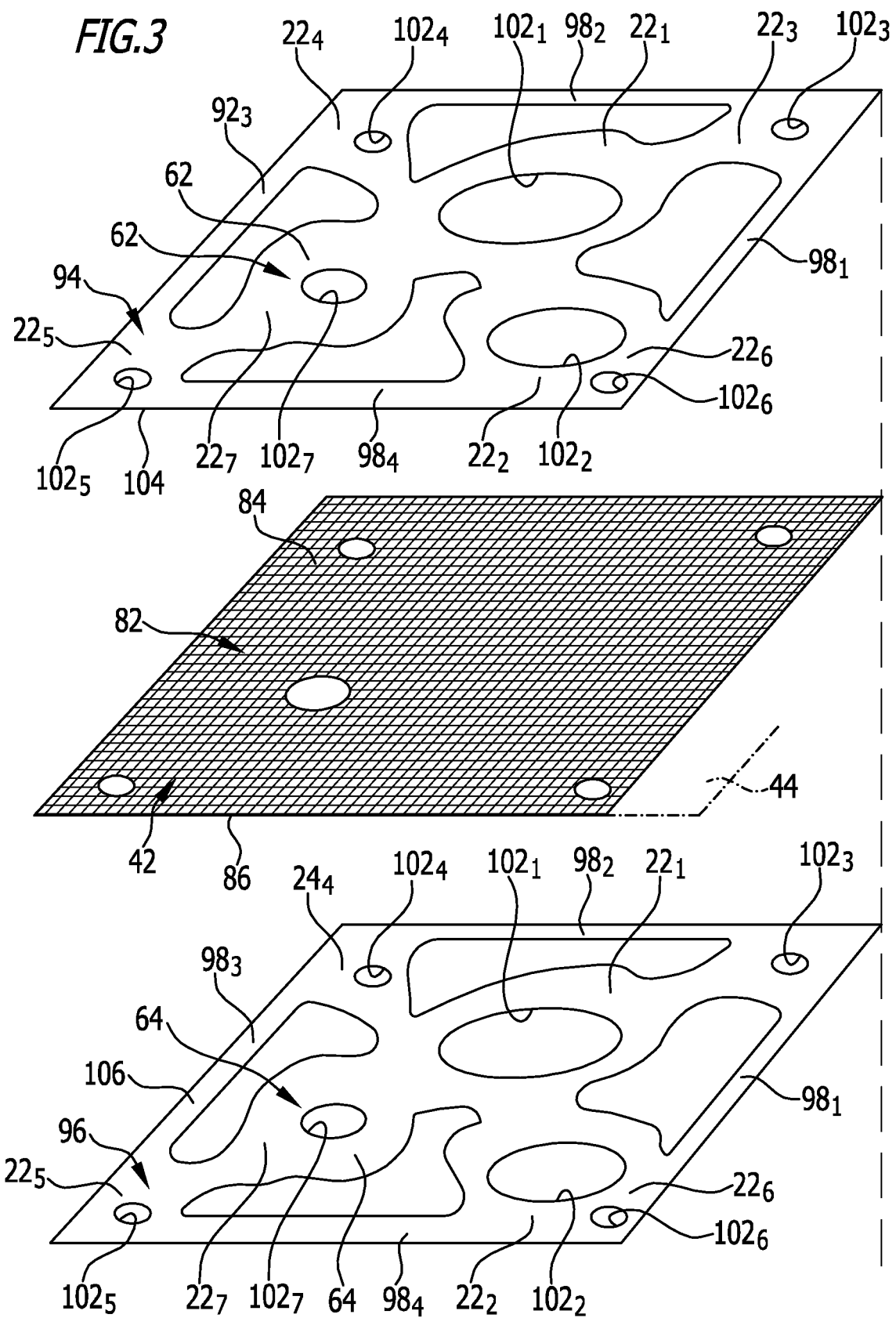
FIG. 3 shows an exploded view of a production of the first exemplary embodiment of the functional element according to the invention.

The production of a functional layer 12 according to the invention takes place, as shown in FIG. 3, for example, in that an appliable blank 94 or 96 comprising the respective sealing material layers 64, 66 is applied to a first side 84 and a second side 86, respectively, on a blank 82 of the woven or braided fabric 42 which extends in the plane 44, wherein the appliable blank 94 is laid with a contact side 104 of the sealing material layers 62 on the first side 84 of the blank 82 and the appliable blank 96 is laid with its contact side 106 of the sealing material layers 64 on the second side 86 of the blank 82 of the woven or braided fabric 42.

Herein, each of the appliable blanks 94 and 96 comprises the respective sealing material layers 62, 64 which are configured coextensively, for example, in the respective appliable blank 94 or 96 and, for example, are also connected to the respective appliable blanks 94 or 96 along edge regions $98_1$ to $98_4$ comprising their outer contour.

In particular, the appliable blanks 94 and 96 can be produced by stamping out of a uniform material layer wherein by means of the stamping out, for example, blank contours $102_1$ and $102_2$ surrounding the screen regions and, for example, also blank contours $102_3$ to $102_6$ surrounding the through openings 16 and a blank contour $102_7$ surrounding, for example, the passage region 18 are formed in the respective appliable blanks 94 or 96.

Thus, on application of the appliable blanks 94 and 96 to the blank 82 of the woven or braided fabric 42, in the region of the sealing material layers 62 or 64, a pre-stage for the later cross-sectionally impermeable layer assembly 32 is already formed in the sealing regions $22_1$ to $22_7$, wherein by means merely of the application of the sealing material layers 62 and 64 to the corresponding regions of the woven or braided fabric 42, as yet no cross-sectionally impermeable layer assembly is formed, since the contact sides 104 and 106 of the appliable blanks 94 and 96 have not so far undergone any adaptation to the woven or braided fabric 42 in the respective regions.

Figure 4:
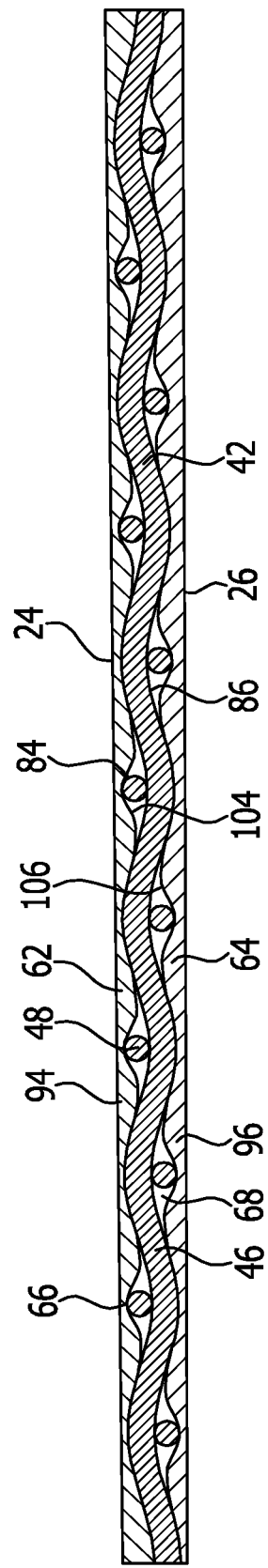
FIG. 4 shows a section through a layer assembly according to FIG. 2 in the region of crossing sites of the threads of the woven or braided fabric with the material of the sealing material layers in the non-mouldable state but without pressure application on the sealing material layers.
Figure 5:
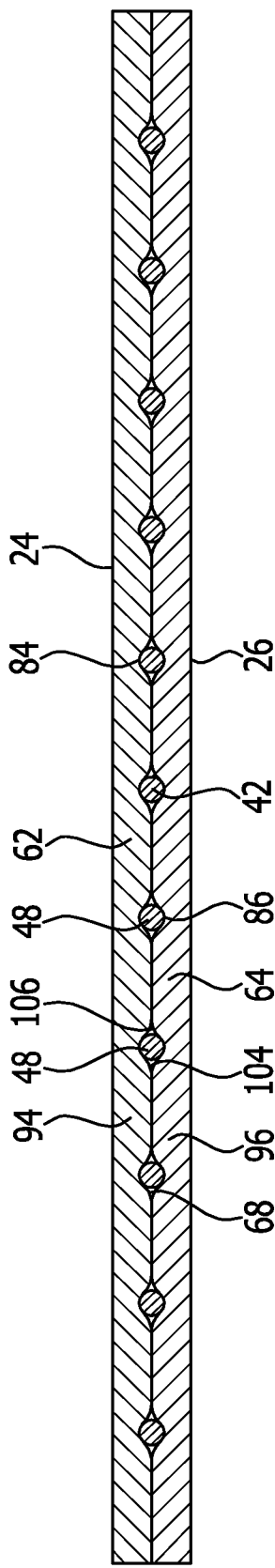
FIG. 5 shows a section similar to FIG. 4 in the same state according to FIG. 4 through the threads of the woven or braided fabric outside the crossing sites.

As shown in FIGS. 4 and 5, an adaptation of the contact sides 104 and 106 of the sealing material layers 62, 64 to the first side 84 or the second side 86 of the woven or braided fabric 42 takes place in that in a mouldable state of the material of the sealing material layers 62 and 64 of the appliable blanks 94 and 96, an action onto the sealing surfaces 24 and 26 by an areal pressing force takes place and leads thereto that when the material of the sealing material layers 62 and 64 is in the mouldable state, the contact sides 104 and 106 adapt to the form of the woven fabric 42 in that the sealing material layers 62, 64 are laid at least partially round the threads 46 and 48 of the fabric 42 by means of plastic deformation.

This adaptation is not a complete adaptation, as shown in FIGS. 4 and 5, so that particularly at the crossing sites 66 and also in the longitudinal direction at the individual threads 46, 48, hollow space regions 68 still remain due to the not yet closed hollow spaces.

Where hollow space regions 68 still exist to a significant extent in the region of the threads 46, 48 and particularly in the region of the crossing sites 66, there is a lack of the required cross-sectional impermeability of the layer assembly 32.

The cross-sectional impermeability of the layer assembly 32 is only achieved when the layer assembly 32 is configured, as shown in FIGS. 6 and 7, such that the sealing material layers 62, 64 enclose the threads 46, 48 such that no significant hollow space regions 86 exist any longer along the threads 46, 48, particularly in the region of the crossing sites 66 thereof, but that the material of the sealing material layers 62 and 64 has been applied extensively round the threads 46, 48 thereat.

A cross-sectionally impermeable layer assembly 32 of this type can be achieved by different means within the scope of the solution according to the invention.

As shown in relation to FIGS. 4 and 5, firstly an adaptation of the contact sides 104 and 106 to the sides 84 and 86 of the woven fabric 42 in the mouldable state of the material of the respective sealing material layer 62, 64 can be achieved.

The possibility exists of further sustaining the mouldable state in order to achieve the cross-sectionally impermeable state of the layer assembly 32 shown in FIGS. 6 and 7, wherein this requires a mouldable state of the material of the sealing material layers 62, 64 with low viscosity, for example, in the value range from 30 to 120 Mooney units.

In particular, due to the viscosity of the material of the sealing material layers 62, 64 in the mouldable state, merely an adaptation of the contact surfaces 104, 106 to the sides 84, 86 of the woven fabric 42 such as shown in FIGS. 4 and 5 can usually be achieved, so that, the hollow spaces 68 are present as before, along the threads 46, 48 of the fabric 42.

If, following such an adaptation of the contact sides 104 and 106 to the threads 46, 48 of the woven or braided fabric, the mouldable state is ended, then it is required that the sealing material layers 62, 64 are also elastic in the non-mouldable state, so that a permanent pressure application to the sealing material layers 62, 64 in the region of their sealing surfaces 24, 26 leads to an elastic deformation of the sealing material layers such that the cross-sectionally impermeable state of the respective layer assembly 32 of FIGS. 6 and 7 can be achieved and maintained with this permanent pressure application to the sealing material layers 62, 64.

Such an areal pressure application to the sealing surfaces 24, 26 lies in the region between 1 and 50 MPa which is permanently present on installation of a functional layer 12 of this type for sealing between two units.

As the material for the sealing material layers 62, 64 which is convertible into a mouldable state and which is subsequently convertible into a no longer mouldable but elastic state, for example, a thermoplastic material is provided which, on sufficiently strong heating converts into the mouldable state and on subsequent cooling, converts into the no longer mouldable but elastic state as before.

Such materials are, for example, thermoplastic elastomers on the basis, in particular, of polyurethane which, for example, are not cross-linked in the mouldable state and are cross-linked in the non-mouldable state.

Consequently, in the mouldable state of the material of the sealing material layers 62, 64, the adaptation of the contact sides 104, 106 to the threads 46, 48 of the woven fabric 42 is carried out so that a state is reachable in which the sealing material layers 62, 64 lie partially around the threads 46, 48, but as before, hollow space regions 68 exist which, due to the high viscosity of the thermoplastic material in the mouldable state cannot be entirely eliminated by compression.

Through subsequent cooling, the sealing material layers 62, 64 of the thermoplastic material transition into the no longer mouldable but elastic state.

If the functional layer 12 according to the invention is installed in the no longer mouldable, but elastic, state of the sealing material layers 62, 64 between the elements to be sealed, then due to the surface pressures arising on installation of this functional layer 12 between the respective elements, the possibility exists of configuring the layer assembly 32 to be cross-sectionally impermeable in the sealing regions 22 in that by elastic deformation of the material of the sealing material layers 62, 64, the hollow space regions 68 are reduced so far that a cross-sectionally impermeable state of the layer assembly 32 is formed.

This cross-sectionally impermeable state then remains in effect for as long as the force application to the functional layer 12 via the sealing surfaces 24, 26 is maintained.

Since the sealing material layers 62, 64 carrying the sealing surfaces 24, 26 are themselves elastic, the sealing material layers can also themselves simultaneously act as seal elements if the sealing surfaces 24, 26 are applied against corresponding rigid surfaces of the elements to be sealed and due to their elasticity, provides a seal therewith.

Such thermoplastic materials are herein either formed so that they themselves wet the threads 46, 48 of the woven or braided fabric 42 or the contact sides 104 and 106 are provided with a film of an adhesion promoter effecting the adhesion on the threads 46, 48 of the woven or braided fabric 42.

In a further exemplary embodiment of the solution according to the invention, it is also conceivable to provide a material of the sealing material layers 62, 64 which can be brought by chemical treatment, for example, with a solvent, into a mouldable state so that at least an adaptation of the contact sides 104, 106 to the threads 46, 48 of the woven fabric 42 can take place, as shown in FIGS. 4 and 5.

In this case, also, a mouldability of this type does not always exist such that the state according to FIGS. 6 and 7 in which the hollow space regions 68 are largely eliminated is achievable, but rather there is typically also only one state of the layer assembly 32 according to FIGS. 4 and 5 achievable in which hollow space regions 68 still exist so that the layer assembly 32 has no sufficient cross-sectional impermeability.

In this exemplary embodiment also, following the transition of the material into the non-mouldable state, the material of the sealing material layers 62, 64 is still elastic so that by means of areal pressure application to the sealing surfaces 24, 26, an elastic deformation of the sealing material layers 62, 64 is achievable such that the hollow space regions 68 become so slight that the layer assembly 32 is cross-sectionally impermeable and consequently also on installation of such a functional layer 12 between two units, the required cross-sectional impermeability is achievable.

In a third exemplary embodiment of a solution according to the invention, as shown in FIG. 8 using the sealing material layer 62, the material of the sealing material layers 62, 64 is a layer 112 of an adhesive and, particularly on pressure application, hardenable material which is arranged between two cover layers 114, 116, wherein the layer 112 between the cover layers 114 and 116 forms a handling assembly 118 from which, for example, the appliable blanks 94, 96 are producible.

For the application of the layer 112 as a sealing material layer 62, 64 to the woven fabric 42, for example, initially the cover layer 116 is pulled off, as shown in FIG. 8, so that the contact side 104 of the layer 112 forming the sealing material layer 62 lies exposed and can be applied to the first side 84 of the woven or braided fabric 42.

In a similar way, in the case of the sealing material layer 64 which is also formed by the layer 112 between two cover layers 114 and 116 (FIG. 9), following production of the appliable blank 96, the cover layer 114 is pulled off so that in this case, the contact side 106 of the sealing material layer 64 can then be applied to the second side 86 of the woven or braided fabric 42.

In that the layers 112 which form the sealing material layers 62 and 64 are adhesive layers, they have a viscosity corresponding to a thickly viscous mass, wherein the layers 112 are in a mouldable state.

There now exists either the possibility, in the case of the sealing material layer 62, to leave the cover layer 114 and to leave the cover layer 116 on the layer 112 of the sealing material layer 64 and, by means of these cover layers 114 and/or 116, to apply an areal force to the layers 112 forming the sealing material layers 62, 64 so that the layers 112 of the sealing material layers 62, 64 which are in the mouldable state adapt, with regard to their form, to and/or lie against the threads 46, 48 of the woven or braided fabric 42 with their contact sides 104, 106, in order to achieve at least one state, as shown in FIGS. 4 and 5, wherein hollow space regions 68 which counteract the required cross-sectional impermeability of the layer assembly 32 still exist along the threads 46, 48.

With this deformation of the layers 112 forming the sealing material layers 62, 64, the material forming this layer 112 has the possibility, however, to harden, in particular to cross-link, by means of a heating and/or the pressure and to transition from the initially plastically mouldable state into a plastically no longer mouldable but elastically deformable state.

On further and continuous pressure application to the sealing material layers 62, 64, due to the existing elastic behaviour thereof, such a reduction of the hollow space regions 68 then takes place that the layer assembly 32 has the required cross-sectional impermeability.

An example of such a material which comprises a layer 112 having such properties is, for example, a so-called pressure sensitive adhesive from the firms Tesa, 3M or Lohmann.

A material of this type has the advantage that it adheres directly to the threads 46, 48 of the woven or braided fabric so that, for example, no film of an adhesion promoter is required.

Following connection of the layers 112 forming the sealing material layers 62, 64, the cover layers 114 or 116 facing away from the woven or braided fabric are pulled off so that the thereby exposed sealing surfaces 24, 26 can be applied directly to the surfaces of the elements to be sealed and the sealing material layers 62, 64 are also effective as seal elements due to their elasticity.

In a fourth exemplary embodiment of a functional layer 12, for production of the handling assembly 118, an adhesive film 119 is provided on the layers 112 forming the sealing material layers 62, 64, specifically on a side facing away from the respective contact side 104, 106 between the layer 112 and the corresponding cover layer 114 or 116, which adhesive film is not hardened by heating or pressure and thus, following the production of the cross-sectionally impermeable layer assembly 32 between the sealing layers 62, 64 and the woven or braided fabric 42 arranged between these, can serve to connect the respective sealing layer 62, 64 to the carrier or a seal element after detachment of the cover layer 114 or 116.

A functional element 10 according to the invention, as described, for example, in relation to the above exemplary embodiments, can be used, in particular, as a flat seal, for example, as a flat gasket in cylinder heads or as a flat seal in the form of an intermediate plate between housing parts of fluid-powered control units.

A control unit of this type identified as 120 is shown, for example, in FIG. 12 wherein it serves to control fluid-powered consumers, for example, fluid-powered transmission units, in particular, transmission units for motor vehicles.

A control unit 120 of this type comprises, for example, a first housing part 122 which is produced, in particular, from metal and a second housing part 124, also in particular, produced from metal, of which, for example, the first housing part has valves 126 and 128 and the second housing part 124 has, for example, a slider 132 wherein these respectively control or regulate a flow of a fluid in the respective housing part 122 or 124.

The two housing parts 122, 124 have channel sides 134 and 136 facing one another which are configured such that the fluid can pass across from the one housing part 122, 124 into the respective other housing part 124, 126.

Inserted between these channel sides 134 and 136 of the housing parts 122, 124 is an intermediate plate identified overall as 140, which abuts the channel side 134 of the first housing part 122 with a first side 142 and abuts the channel side 136 of the second housing part 124 with a second side 144 and closes imperviously with the channel sides 134 and 136, wherein passages in the intermediate plate 140, for example, the passages 152, 154 and 156 and possibly further passages are provided, through which a transfer of the fluid from one housing part 122, 124 into the other housing part 124, 122 takes place.

Herein, some of the passages, for example, the passages 152 and 156 enable unhindered transfer of the fluid from one housing part 122, 124 into the other housing part 124, 122 and additionally thereto, some of the passages, for example, the passage 154, serve as a functional element to influence the fluid transferring from one housing part 122, 124 into the other housing part 124, 122, wherein by means of a passage 154 of this type, for example, a specifically adaptable throttle effect can be achieved for controlling sequences, in particular temporal sequences in gear change processes.

Figure 14:
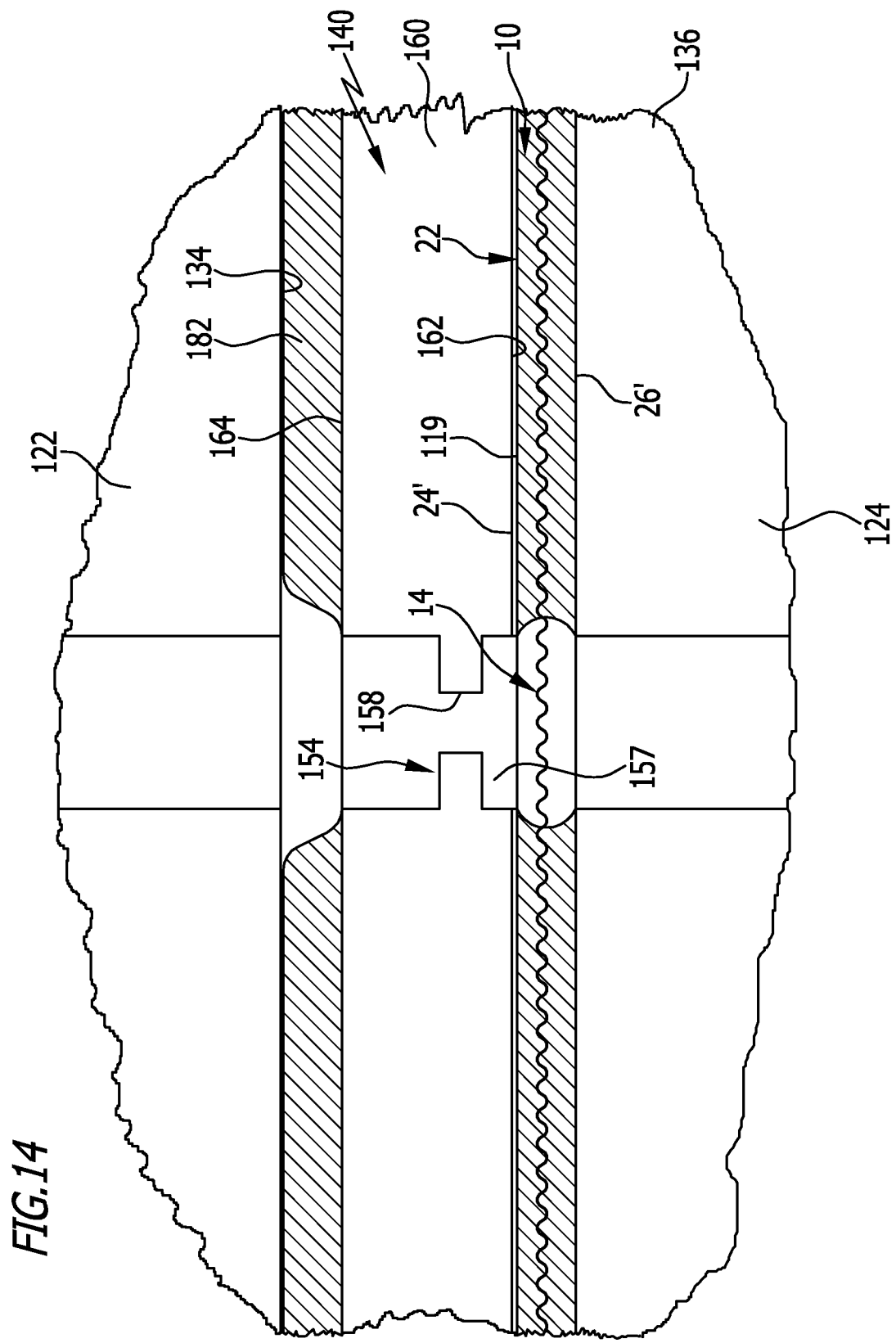
FIG. 14 shows a section through a second embodiment of the intermediate plate according to FIG. 12 with a functional element according to the invention and according to the third exemplary embodiment integrated therein.

In the second embodiment of the intermediate plate 140 according to the invention shown in FIG. 14, for example, the passage 154 is narrowed by the intermediate plate 140 by means of a throttle opening 158 which is arranged in a central unit 160 of the intermediate plate 140.

The central unit 160 is formed, for example, by a metal plate.

Arranged on one side of the central unit 160 is, for example, a functional element 10 according to the invention in accordance with the fourth exemplary embodiment, wherein this abuts with its sealing surface 24' formed by the adhesive film 119 directly on a surface 162 of the central unit 160 representing a contact surface.

The opposite sealing surface 26' abuts the channel side 136 so that the functional element 10 according to the invention lies between the metal layer 160 of inelastic height and the channel side 136 of inelastic height and, due to the low surface roughness levels of the sealing surfaces 24 and 26 can provide a seal with them.

Furthermore, the functional element 10 is arranged so that the screen region 14 is arranged overlapping with a recess 157 which transitions into the throttle opening 158 so that fluid can flow through the screen region 14 to the throttle opening 158.

For example, a sealing of the intermediate plate 140 relative to the channel side 134 of the housing part 122 takes place in that the central unit 160 carries a seal element 182 on its surface 164 facing toward the channel side 134 wherein the seal element 182 can be formed either as an elastomer layer or as a metallic seal element, for example with beads.

In a first embodiment of the intermediate plate 140' shown in FIG. 13, it is formed solely by the functional element 10, according to the first or second or third exemplary embodiment, which directly abuts the channel sides 134 and 136 with its sealing surfaces 24, 26.

Due to the low surface roughness of, for example, less than 10 μm, a direct sealing to the channel sides 134 and 136 formed to be of inelastic height takes place, wherein preferably the housing parts 122, 124 are connected to one another so that the channel sides 134 and 136 abut the sealing surfaces 24, 26 with a surface pressure of at least 1 MPa (megapascal).

The invention claimed is:

1. A functional element for flat seals comprising:
   a functional layer having a screen region with through openings for the passage of a fluid, the screen region further including threads of a woven or braided fabric which extends through the whole functional layer;
   wherein the functional layer includes a sealing region which surrounds the screen region, with sealing region sealing material layers on both sides of the woven or braided fabric, the sealing material layers forming a cross-sectionally impermeable layer assembly with the woven or braided fabric;
   wherein there are hollow space regions at least between the threads of the woven or braided fabric which are not impermeably closed to fluid flow by the sealing material layers, and the sealing material layers are sufficiently elastic such that, upon an areal application of pressure, the sealing material layers deform elastically and adapt to the woven or braided fabric, and wherein the hollow space regions are so reduced that the woven or braided fabric and the sealing material layers form a crosssectionally impermeable layer assembly as long as the pressure is applied.

2. Functional element according to claim 1, wherein the sealing material layers are provided with a contact side facing toward the woven or braided fabric, a surface structure of said contact side being adapted to a structure of the woven or braided fabric.

3. Functional element according to claim 1, wherein the sealing material layers are made of a thermoplastic material.

4. Functional element according to claim 1, wherein the sealing material layers and the woven or braided fabric are connected to one another by adhesion.

5. Functional element according to claim 4, wherein the material of the sealing material layers adheres to the woven or braided fabric.

6. Functional element according to claim 4, wherein the material of the sealing material layers is connected to the woven or braided fabric by means of an adhesion promoter.

7. Functional element according to claim 1, wherein the sealing material layers appliable blanks.

8. Functional element according to claim 7, wherein the appliable blanks are provided with at least one cut-out for the at least one screen region.

9. Functional element according to claim 7, wherein the appliable blanks are provided with at least one cut-out for at least one through opening region of the functional layer.

10. Functional element according to claim 7, wherein the appliable blanks are provided with at least one cut-out for at least one passage region of the functional layer.

11. Functional element according to claim 7, wherein the appliable blanks are cut to size such that the sealing material layers for all the sealing regions of the functional layer are connected to one another coextensively.

12. Functional element according to claim 7, wherein the sealing material layers are formed as sub-regions of appliable blanks which are to be applied as a whole from both sides to a blank of the woven or braided fabric.

13. Functional element according to claim 7, wherein the appliable blanks have an external blank contour which extends following an external blank contour of the woven or braided fabric.

14. Functional element according to claim 7, wherein, in the elastically deformable state, the appliable blanks have a Shore hardness in the range from 40 Shore A to 90 Shore A.

\* \* \* \* \*